Dec. 6, 1949  L. W. CORNWALL  2,490,209
ELECTRIC MOTOR
Filed April 3, 1946

INVENTOR.
LEO W. CORNWALL
BY
A. B. Bowman
ATTORNEY

Patented Dec. 6, 1949

2,490,209

UNITED STATES PATENT OFFICE 2,490,209

ELECTRIC MOTOR

Leo W. Cornwall, San Diego, Calif., assignor to Veterans Guild of America, Chula Vista, Calif., a corporation of California Application April 3, 1946, Serial No. 659,213

2 Claims. (Cl. 172—36)

My invention relates to an electric motor, and the objects of my invention are:

First, to provide an electric motor of this class having field plates upon which the windings are readily placed and which are properly connected together by tapered portions maintaining efficient magnetic flux throughout the separable portions of the field plates;

Second, to provide an electric motor of this class in which the rotor shaft is accurately positioned with respect to the field plates by self-aligning bearings supporting said rotor, whereby minimum tolerance may be maintained between the periphery of said rotor and said field plates;

Third, to provide an electric motor of this class in which the field plates completely surround the rotor in integral relationship whereby certain clearance of the field plates around the rotor is maintained;

Fourth, to provide an electric motor of this class in which the field plates are provided with rotor receiving openings therein providing a completely surrounded rotor responsive to the shaded poles of the field plates which are integral with each other and relieved by an increased diameter segment cut-out spaced diametrically from the walls of the rotor receiving opening in said field plates;

Fifth, to provide an electric motor of this class having novel reduction driving means simultaneously engageable with the motor shaft and the driven mechanism operated by my electric motor;

Sixth, to provide an electric motor of this class having novel shaft bearings which are self-aligning and extremely accurate; and Seventh, to provide an electric motor of this class which is very simple and economical of construction, efficient in operation and which will not readily deteriorioate or get out of order.

Figure 1:
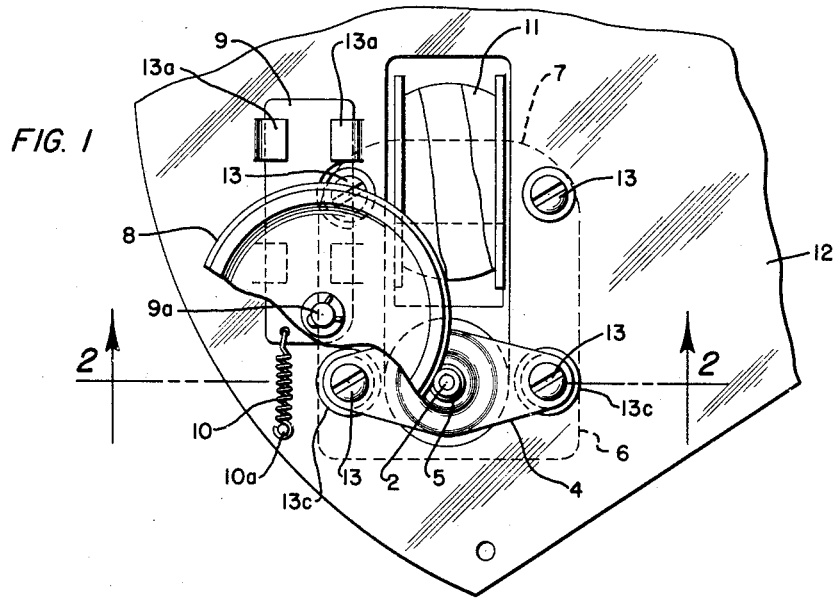
Figure 2:
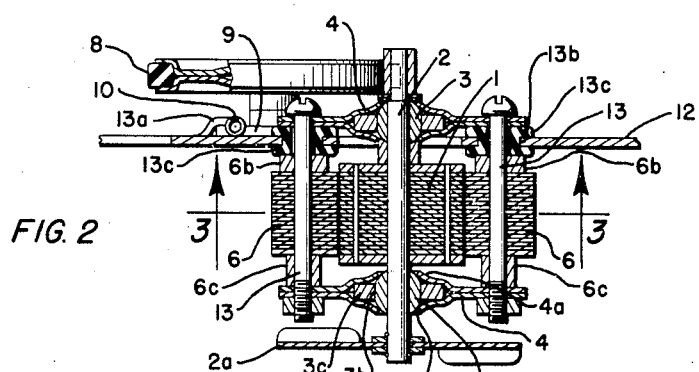
Figure 3:
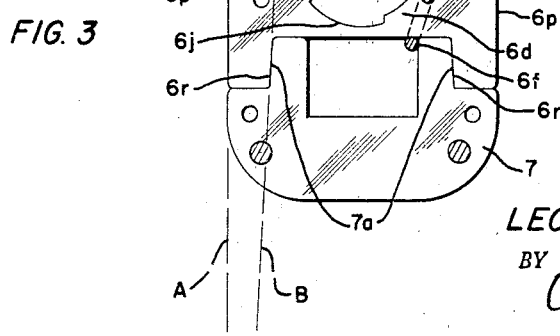

With these and other objects in view as will appear hereinafter, my invention consists of certain novel features of construction, combination and arrangement of parts and portions as will be hereinafter described in detail and particularly set forth in the appended claims, reference being had to the accompanying drawings and to the characters of reference thereon forming a part of this application in which:

Figure 1 is a fragmentary end view of my electric motor; Figure 2 is a fragmentary sectional view taken from the line 2—2 of Figure 1, and Figure 3 is a side elevational view of one of the field plates of my electric motor taken from the line 3—3 of Figure 2.

Similar characters of reference refer to similar parts and portions throughout the several views of the drawing.

The rotor 1, shaft 2, bearings 3, bearing plates 4, roller 5, field plates 6 and 7, roller 8, slide plate 9, spring 10, field winding 11, frame plate 12 and the bolts 13 constitute the principal parts and portions of my electric motor.

The rotor 1 is secured to the shaft 2 mounted in the self-aligning bearings 3. These self-aligning bearings 3 are each provided with arcuate portions 3a at their opposite ends supported in the bearing plates 4, as shown best in Figure 2 of the drawings. Intermediate the arcuate portions 3a at opposite ends of these self-aligning bearings 3 are peripheral straight portions 3b engaged by the washers 3c intermediate the bearing plates 4. These bearing plates 4 are each provided with central openings therein surrounded by engaging portions 4a holding the arcuate portions 3a of the self-aligning bearings 3 in concentric relationship with the rotor receiving openings 6a of the field plates 6, as shown best in Figures 2 and 3 of the drawings. Secured on one end of the shaft 2 adjacent one of the bearings 3 is the roller 5 which is a frictional driving roller engaging the roller 8 of considerably larger diameter providing a reduction driving means which may be used for operating phonograph turntables, or the like. The roller 8 is mounted on an axle 9a secured to the slide plate 9 which is slidable in the ways tabs 13a formed in the frame plate 12, as shown best in Figures 1 and 2 of the drawings. The spring 10 is secured at its end portion 10a to the frame plate 12 and is secured at its opposite end to the slide plate 9 tending to force the roller 8 into engagement with the roller 5 by means of the reciprocal movement of the slide plate 9 in the ways tabs 13a. Secured on the opposite end of the shaft 2 from the roller 5 is a fan 2a arranged to provide cooling of the electric motor. The frame plate 12 is provided with openings 13b in which the grommets 13c are positioned for supporting the bolts 13 which pass through the bearing plates 4, field plates 6, and maintain my electric motor in assembling. It will be noted that the field plates 6 are interposed between spacers 6b and 6c. Each of the field plates 6, as shown in Figure 3 of the drawings, is provided with a rotor receiving opening 6a therein. It will be noted that this rotor receiving opening 6a is blanked out of the field plates 6, and that the field plates 6 are provided with integral portions completely surrounding the rotor receiving opening 6a whereby the clearance tolerance of the field strips with the rotor may be very accurately maintained.

These field plates 6 are provided with shaded pole portions 6d and 6e adjacent to which are copper wires 6f and 6g surrounding the same. Adjacent the shaded pole portions 6d and 6e are increased diameter segment cut-out portions 6h and 6j. These segment cut-out portions 6h and 6j are arcuate and are formed on a longer radius than the opening 6a whereby increased clearance outwardly of the rotor 1 is maintained at the segment cut-out portions 6h and 6j. The copper wires 6g and 6f extend through openings 6k and 6m adjacent the armature receiving openings 6a, all as shown best in Figure 3 of the drawings. The field plates 7 support the field winding 11, not shown in Figure 3 of the drawings, and these field plates 7 are provided with engaging portions 7a which are substantially straight and in acute angular relationship with the sides 6p of the field plates 6. The field plates 6 are provided with conforming engaging portions 6r adapted to provide frictional contact between the field plates 6 and 7 when assembled. The broken lines A and B in Figure 3 of the drawings indicate the acute angular relationship of the engaging portions 7a and 6r of the field plates 6 and 7 respectively when assembled.

The operation of my electric motor is substantially as follows:

The segment cut-out portions 6h and 6j provide certain relief for the shaded pole portions 6d and 6e while the integral surrounding relationship of the field plates 6 with the rotor 1 insure accurate clearance of the field plates 6 with the rotor 1. The self-aligning bearings 3 on the shaft 2 carrying the rotor 1 maintain the rotor 1 in concentric relation with the cut-out portions 6a of the field plates 6 whereby very close tolerance may be maintained between the rotor 1 and the field plates 6 measurably increasing the efficiency of my electric motor. The angularly contacted engaging portions 7a and 6r of the field plates 7 and 6 respectively provides facility in the assembly of my electric motor and efficiently maintains the magnetic flux throughout the field plates 6 and 7. The sliding relationship of the slide plate 9 together with the roller 8 actuated by the spring 10 provides uniform contact of the roller 8 with a phonograph turntable, or the like and the roller 5 on the motor shaft 2.

Though I have shown and described a particular construction, combination and arrangement of parts and portions, I do not wish to be limited to the particular construction, combination and arrangement, but desire to include in the scope of my invention the construction, combination and arrangement substantially as set forth in the appended claims.

Having thus described my invention what I claim as new and desire to secure by Letters Patent is:

1. In an electric motor, the combination of field plates having rotor receiving openings therein and having integral portions entirely surrounding said rotor receiving openings, each of said field plates having shaded pole portions and segment cut-out portions adjacent thereto concentric with said rotor receiving openings and formed on a longer radius than said rotor receiving openings said segment cutout portions directly communicating with said rotor receiving openings, second field plates having engaging portions disposed at an acute angle to each other, said first-mentioned field plates having conforming engaging portions arranged to provide a wedging contact between said first-mentioned field plates and said second field plates only, and a field winding on said second field plates.

2. In an electric motor, the combination of field plates having rotor receiving openings therein and having integral portions entirely surrounding said rotor receiving openings, each of said field plates having shaded pole portions and segment cut-out portions adjacent thereto concentric with said rotor receiving openings and formed on a longer radius than said rotor receiving openings said segment cutout portions directly communicating with said rotor receiving openings, second field plates having engaging portions disposed at an acute angle to each other, said first-mentioned field plates having conforming engaging portions arranged to provide a wedging contact between said first-mentioned field plates and said second field plates, and a field winding on said second field plates, said second field plates being substantially U-shaped in form and having said engaging portions at opposite ends thereof and at the outer edges thereof.

LEO W. CORNWALL.

REFERENCES CITED

The following references are of record in the file of this patent:

UNITED STATES PATENTS

| Number | Name | Date |
|---|---|---|
| 1,983,091 | Larsh | Dec. 4, 1934 |
| 2,025,817 | Lanz | Dec. 31, 1935 |
| 2,072,894 | Lilja | Mar. 9, 1937 |
| 2,092,339 | Steenbeck | Sept. 7, 1937 |
| 2,161,148 | Erwood | June 6, 1939 |
| 2,261,889 | Schneider | Nov. 4, 1941 |
| 2,330,824 | Granfield | Oct. 5, 1943 |